United States Patent [19]

Goodell et al.

[11] Patent Number: 4,470,506

[45] Date of Patent: Sep. 11, 1984

[54] AUTOMATIC TIRE INFLATION SYSTEM RETROFITTING KIT

[75] Inventors: Fred L. Goodell, Grosse Ile; Michael J. Ellison, Canton, both of Mich.

[73] Assignee: AM General Corporation, Detroit, Mich.

[21] Appl. No.: 425,743

[22] Filed: Sep. 28, 1982

Related U.S. Application Data

[60] Division of Ser. No. 311,855, Oct. 16, 1981, , which is a continuation of Ser. No. 288,834, Jul. 31, 1981, Pat. No. 4,418,737.

[51] Int. Cl.³ ...................... B65D 69/00; B65D 85/68
[52] U.S. Cl. .................................... 206/223; 152/416; 152/417; 206/335
[58] Field of Search ............... 152/415, 416, 417, 427, 152/388, 389, 391, 392, 401, 405; 137/224, 351; 301/105 R, 126, 131, 132, 5 VH; 285/111, 190, 272; 308/208; 277/152, 153; 206/223, 335; 384/208

[56] References Cited

U.S. PATENT DOCUMENTS

| | | | |
|---|---|---|---|
| 2,577,458 | 12/1951 | Gaiptman | 152/416 |
| 2,634,782 | 4/1953 | Turek et al. | 152/417 |
| 2,634,783 | 4/1953 | Turek et al. | 152/417 |
| 2,685,906 | 8/1954 | Williams | 152/417 |
| 2,693,841 | 11/1954 | Webster, Jr. | 152/417 |
| 2,715,430 | 8/1955 | Lindeman | 152/416 |
| 2,944,579 | 7/1960 | Kamm et al. | 152/416 |
| 3,362,452 | 1/1968 | Harnish | 152/416 |
| 3,705,614 | 12/1972 | Juttner et al. | 152/417 |
| 4,313,483 | 2/1982 | Brockmann | 152/416 |

Primary Examiner—William A. Powell
Assistant Examiner—Thomas Bokan
Attorney, Agent, or Firm—Harness, Dickey & Pierce

[57] ABSTRACT

A kit for retrofitting a vehicle to include an automatic tire inflation system is disclosed. The kit includes a control box for mounting within the cabin of the vehicle. The control box includes a selector device that is manually actuable by the operator to select the desired pressure for the tires. A valve is used to inflate or deflate the tires as a function of the pressure differential between the actual and the desired tire pressures. In the preferred embodiment, the actual tire pressure is monitored by way of a static pressure tank connected to the tires through a fixed orifice. The kit permits a manufacturer to mass produce a certain vehicle and then selectively choose which ones of the vehicles are to be provided with an automatic tire inflation system.

14 Claims, 11 Drawing Figures

AUTOMATIC TIRE INFLATION SYSTEM RETROFITTING KIT

CROSS REFERENCE TO RELATED APPLICATIONS

This application is a divisional application of U.S. Ser. No. 311,855, filed Oct. 16, 1981 entitled "Automatic Tire Inflation System", by Fred L. Goodell et al; which is a continuation-in-part application of U.S. Ser. No. 288,834, filed July 31, 1981 now U.S. Pat. No. 4,418,737, having the same title, inventors, and assignee as the present invention.

DESCRIPTION

1. Technical Field

This invention relates generally to tire inflation systems and, more particularly, to apparatus for automatically regulating the pressure in vehicular tires.

2. Background Art

It is well known that the traction of vehicles on soft terrain may be greatly improved by decreasing the pressure within the tires. By decreasing the pressure, the tire supporting surface will increase thereby enlarging the contact area between the tires and the terrain. Additionally, it is often desirable to decrease the tire pressure to increase riding comfort on rough roads. On the other hand, higher tire pressures decrease rolling resistance and tire carcass temperatures on smooth roads thereby increasing economy and safety.

It would be desirable to be able to adjust the pressure within the tires without having to stop the vehicle and manually inflate or deflate the tires. This is especially true for military vehicles which usually travel in columns, many times under conditions whereby stoppage of the vehicle would delay the entire column. Additionally, if the military vehicle is under enemy attack it is imperative that the vehicle maintain its maneuverability for as long as possible. If a tire has been punctured by gunfire or the like it is necessary to be able to at least partially inflate the tires very quickly so that the vehicle remains usable.

Various automatic tire inflation systems have been used in the past to alleviate one or more of these problems. One such system was standard equipment on U.S. Army vehicles known as the "Duk" which were used in World War II. This technique used a so-called Schrader valve system in which air pressure was supplied through long wand-like conduits which protruded from the vehicle wheel openings in the frame and fed air into rotating couplings connected to the exterior of the hubs. A second line from the inboard edge of the rotating couplings were connected to the valve stems in the inner tubes for the tires.

One of the problems with this approach was its extreme vulnerability to damage since the conduits which carried the air were exposed to the rough terrain over which the vehicles passed. The conduits were subject to being broken or damaged by coming into contact with brush, rocks, or other vehicles.

In an attempt to improve upon this system there have been several reported attempts to provide an internal air pressure feed technique that would not be subject to such abuse. It is believed that some of the vehicles used in the U.S.S.R. and its satellite countries have used automatic tire inflation systems in which air from a compressed air source is routed through the wheel assembly and into the tire. Additionally, the following U.S. Patents form a representative, but not exhaustive, list of various other approaches to automatic tire inflation systems: U.S. Pat. No. 2,693,841 to Webster, Jr.; U.S. Pat. Nos. 2,944,579 and 2,976,906 to Kamm et al; U.S. Pat. Nos. 2,634,783 and 2,634,782 to Turek at al; U.S. Pat. No. 2,577,458 to Gaiptman; U.S. Pat. No. 2,849,047 to Lamont et al; U.S. Pat. No. 3,362,452 to Harnish; U.S. Pat. No. 1,800,780 to Daneel; U.S. Pat. No. 3,705,614 to Juttner et al; U.S. Pat. No. 2,715,430 to Lindeman; and U.S. Pat. Nos. 4,019,552 and 4,154,279 to Tsuruta.

One of the major drawbacks of these various approaches is that they generally require a substantial amount of operator attention to achieve the desired air pressure. For the most part, these systems require an operator to activate an inflate or deflate switch and then continually monitor an air pressure gauge until the desired pressure is reached at which time the operator must deactivate the switch. Moreover, no provision was made for accurately and automatically maintaining the tire pressure once initially set by this operation. These problems are especially acute when the vehicle is under enemy attack where the soldier's time could be much better spent in defending himself than in watching gauges.

Equally unsatisfactory is the prior art approach to controlling the inflate/deflate valve. In the past only one control valve was generally used which gradually opened or shut depending on the pressure differential between the desired and actual pressure within the tires. For example, as the pressure differential decreased the valve gradually shut off until there was equilibrium. Unfortunately, this technique unduly increased the inflate/deflate cycle time which is extremely important under battle conditions.

A simple, yet reliable seal for the air passageway between the rotating and nonrotating members of the wheel assembly has been difficult to obtain in the past. Many of the prior art approaches have been relatively complex and hard to assemble. Commonly used air seals with one or more generally vertically extending sealing flaps may have a tendency to lift up from their surfaces under high pressure thereby destroying the integrity of the seal. Still other seal designs were located outside of the bearings and exposed to adverse environmental conditions reducing their useful lives.

Many of the internal air feed wheel assemblies cut into load bearing members (e.g. axles, shafts) to form the air passageways. This unfortunately reduces the strength in these members. Some of the prior approaches also required relocation of the bearings from their originally designed position thereby often necessitating redesign of related parts at additional cost.

Many of the military vehicles currently in use still have many years of useful lives left or they are still in production. In some instances it would be desirable to modify these vehicles at low cost to include an automatic tire inflation system. However, many of the prior art approaches are specifically designed for a particular application and cannot easily be incorporated into conventionally used military vehicles such as M809, M44A2 and M939 military trucks.

The present invention is directed to solving one or more of the problems set forth above.

DISCLOSURE OF THE INVENTION

The present invention is directed towards a kit for retrofitting vehicles so as to include an automatic tire inflation system. The kit includes a control box which is adapted to be mounted within the cab of the vehicle and includes a manually actuable selector device so that the operator can select the desired pressure for the tires. Valve means includes one or more valves which control inflation or deflation of the tires as a function of the pressure differential between the desired and actual tire pressures. Preferably, the kit further includes a static pressure tank which is adapted to be coupled to the tires and provides an indication of the actual pressure therein. If the vehicle is not already equipped with wheel assemblies adapted for automatic tire inflation systems, then the kit may also include replacement and/or adapter parts for the wheel assembly. The use of the kit of the present invention allows the vehicle owner to upgrade his equipment to include an automatic tire inflation system with minimal cost and required labor.

BRIEF DESCRIPTION OF THE DRAWINGS

These and other advantages of the present invention will become apparent to one skilled in the art after reading the following specification and by reference to the drawings in which.

BEST MODE FOR CARRYING OUT THE INVENTION

Figure 1:
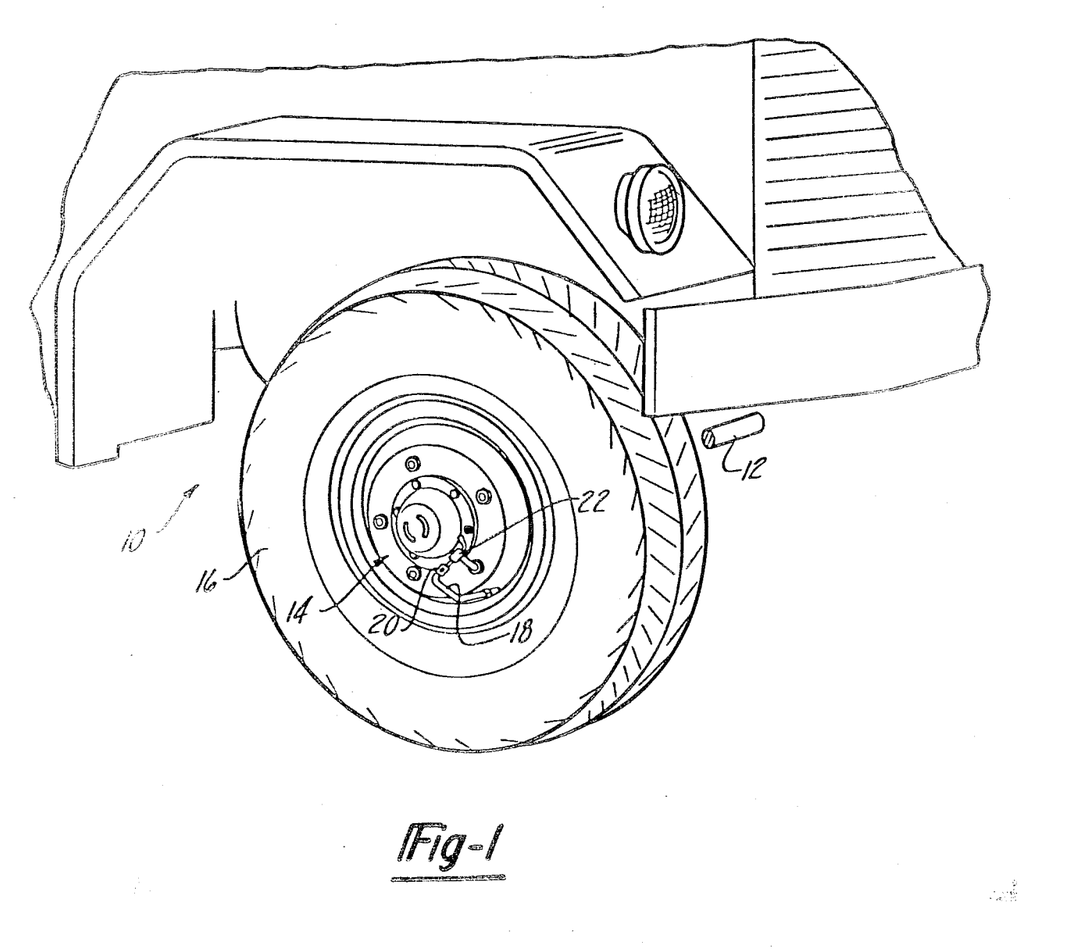
FIG. 1 is a perspective view of a wheel assembly made in accordance with one aspect of this invention.

Certain aspects of the present invention find particular utility in connection with a military vehicle of the type shown in FIG. 1. Vehicle 10 may be a five ton M813 cargo truck built for the U.S. Army by AM General Corporation, the assignee of the present invention. In FIG. 1 a portion of vehicle 10 is shown illustrating a front axle 12 driving wheel assembly 14 onto which tire 16 is mounted. Also shown in FIG. 1 is an air line 18 having a conventional tire inlet valve stem 20 and a manual shutoff valve 22.

It should be understood from the outset that while this invention will be described in connection with a particular type of vehicle, the broader concepts embodied in this invention can be used in other types of vehicles such as buses, heavy duty trucks, vans and the like. Therefore, the particular embodiments described in this specification should not be construed to be limiting examples.

Figure 2:
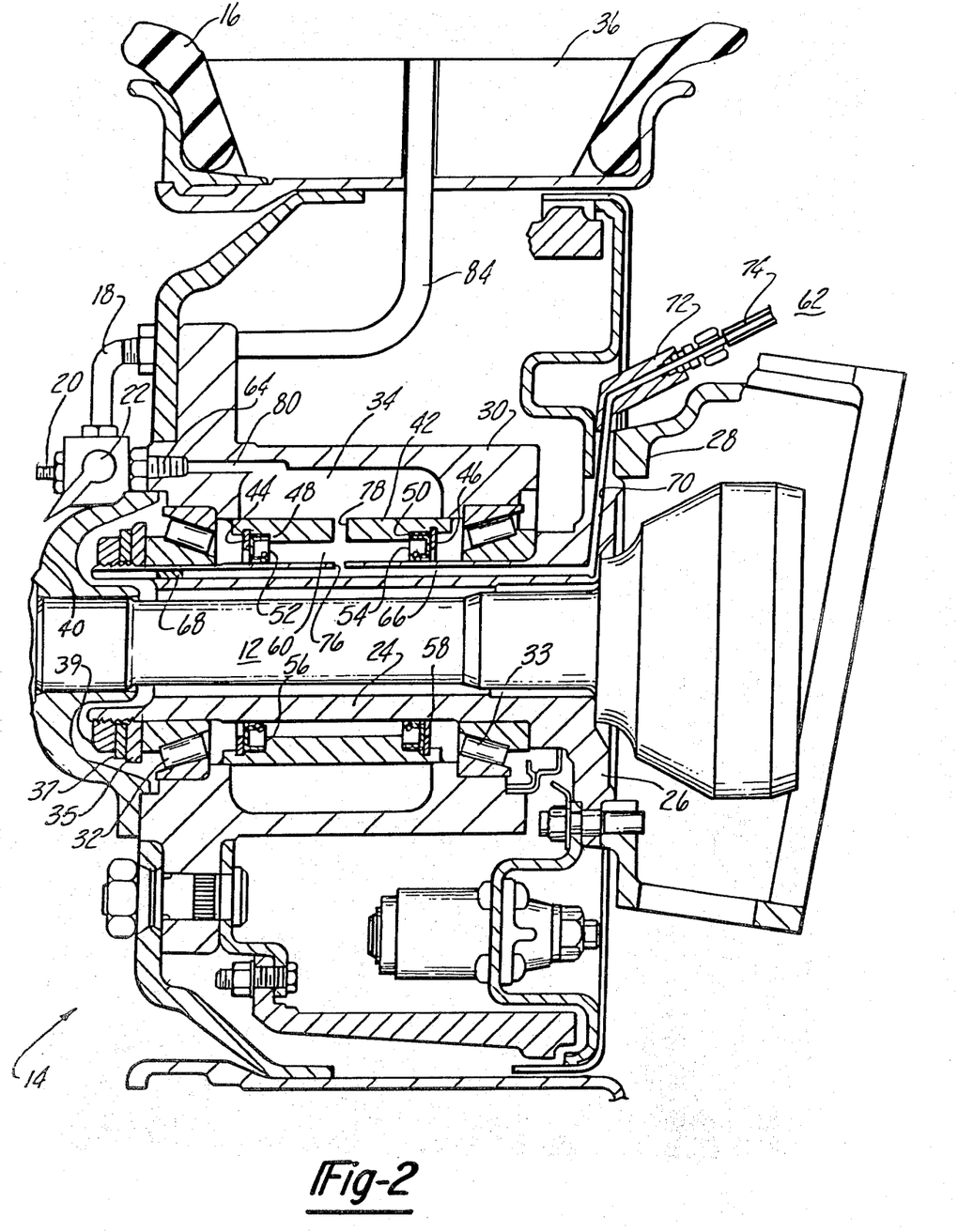
FIG. 2 is a cross sectional view of the wheel assembly shown in FIG. 1.
Figure 3:
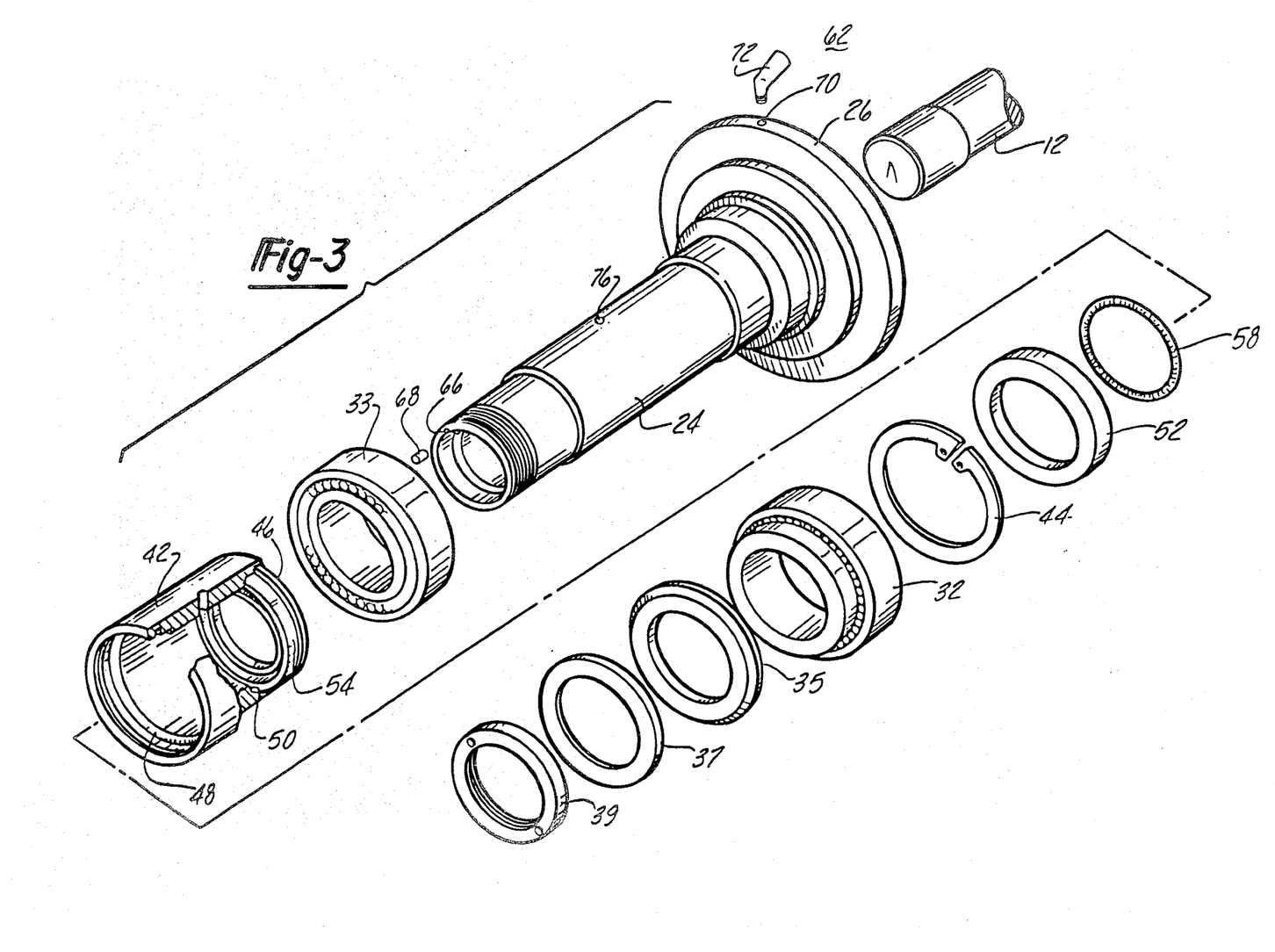
FIG. 3 is an exploded perspective view of portions of the wheel assembly.

Turning to FIGS. 2 and 3, wheel assembly 14 includes a tubular spindle 24 whose inboard portion expands somewhat to form a back flange 26. Spindle 24 is stationary, i.e., nonrotatable, since back flange 26 is bolted to the vehicle chassis 28. Hub 30 is mounted for rotation about spindle 24 by way of conventional bearings 32, 33. The left hand bearing 32 is held in place by way of members 35, 37, and 39. Hub 30 includes a centrally disposed cavity 34 therein. Tire 16 is mounted about the outer periphery of hub 30 using known techniques incorporating bead lock 36. Axle 12 passes through the hollow spindle 24. The inboard portion of axle 12, for a driven wheel, is coupled to a suitable source of rotational power such as a differential. The outer end of axle 12 includes splines (not shown) which engage corresponding slots in drive flange 40. Drive flange 40, in turn, is bolted to hub 30 to impart rotational movement to tire 16 in unison with the rotation of axle 12.

The wheel assembly thus far described is conventional. Pursuant to the present invention, wheel assembly 14 can be readily modified so as to provide a sealed rotating air coupling with a minimum amount of modification. An annular sleeve 42 has its outer edges connected, as by welding, to hub 30 so that the sleeve 42 generally bridges central cavity 34 in hub 30. The interior portions of sleeve 42 include two spaced grooves for receiving snap rings 44, 46. Sleeve 42 also provides shoulders 48 and 50 which oppose snap rings 44 and 46, respectively.

The pair of snap ring-shoulder combinations in sleeve 42 defines a seat for receiving the outer peripheral surfaces of sealing rings 52, 54. Sealing rings 52, 54 are in the form of open-ended annular channels having a rigidly constructed outer body and a flexible inner lip seal preferably made of synthetic rubber. Garter springs 56, 58 provide radially inward compressive forces on the flexible lip seals which ride on the outer surface of spindle 24. This arrangement defines an interior chamber 60 which surrounds spindle 24. More will be said about sealing rings 52, 54 later herein.

Provision is now made for making a sealed air passageway between an inlet 62 in the non-rotating portion of wheel assembly 14 and an outlet 64 in the rotating hub 30. A first bore 66 is drilled in sleeve 24 throughout substantially its entire length, preferably by a rifle drilling technique. The left hand portion of bore 66 is sealed off with a plug 68. A second downwardly extending bore 70 in flange 26 is drilled until it meets the right hand portion of bore 66. A generally L-shaped fitting 72 is welded to the spindle to extend bore 70 so that it can be readily coupled to an air source delivered by hose 74. A generally orthogonally directed opening 76 extends between chamber 60 and the first bore 66 in spindle 24. Sleeve 42 similarly includes an opening 78 so that air can communicate between chamber 60 and cavity 34. A third bore 80 is then drilled in hub 30 which extends into cavity 34 to provide a passageway between threaded outlet 64 and cavity 34.

Air supplied to inlet 62 passes through bores 70 and 66, then out of opening 76 in the stationary portion of the wheel assembly 14. The air next passes out of opening 76 and into chamber 60. Air is prevented from escaping to the outside environment by way of the sleeve 42 and air seals 52, 54 which rotate with hub 30. When there is compressed air in chamber 60 the air seals 52, 54 are urged against spindle 24 and their respective retaining rings 44, 46 thereby providing excellent protection from escape of the air. The air in chamber 60 passes through opening 78 into cavity 34 and thence through bore 80 to outlet 64.

Pursuant to a feature of this invention a manual shutoff valve 22 is connected to outlet 64. Downstream of shutoff valve 22 is a manual fill line or valve stem 20. Consequently, the user may manually fill tire 16 by closing shutoff valve 22 to block outlet 64 so that the air can be supplied externally through stem 20 which passes through tube 18 back through hub 30 which, in turn, communicates with a line 84 which enters the interior portion of tire 16. Under normal operating conditions, however, the air to the tires is supplied automatically.

Instead of modifying conventional wheel assemblies by the use of the sleeve construction previously discussed, it may be desirable to provide an entirely new hub design instead of, or as a replacement for, those hubs which are not adapted for automatic tire inflation systems. Pursuant to another aspect of this invention an alternative wheel assembly design is provided as shown in FIGS. 6–9. To a large extent the wheel assembly of this alternative embodiment is quite similar to the previously described embodiment. Consequently, the same reference numerals will be used to designate like parts. A major difference between the two embodiments is that the latter embodiment employs a new hub design in contrast with the use of conventional hubs discussed in the previous embodiment.

Figure 6:
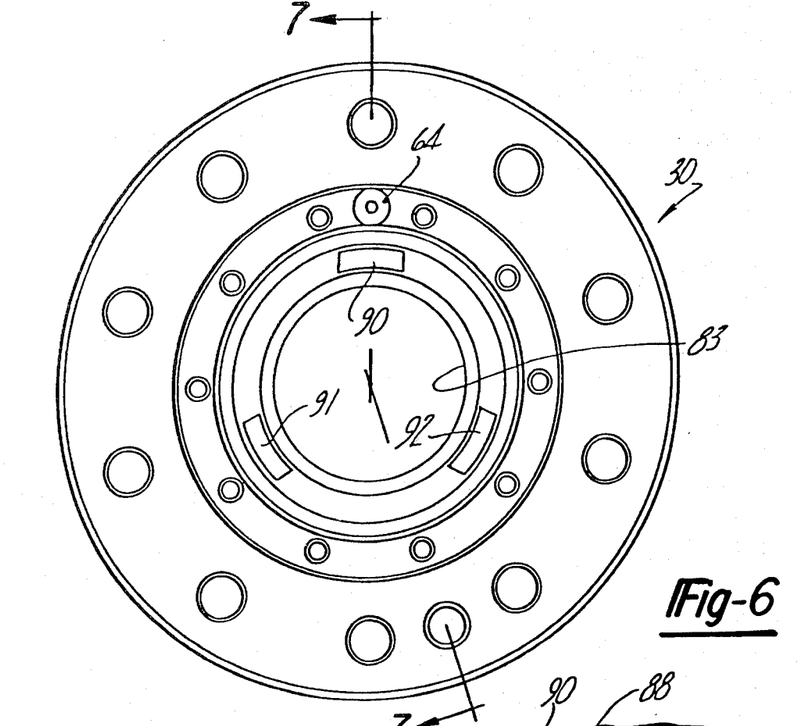
FIG. 6 is an end view of a hub made pursuant to an alternative embodiment of this invention.
Figure 7:
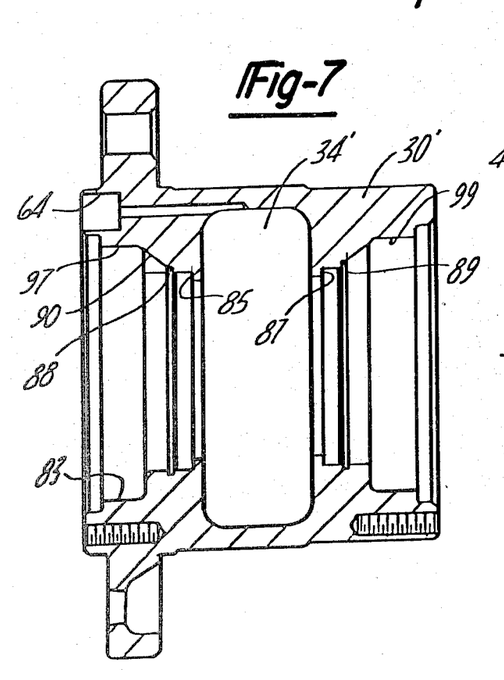
FIG. 7 is a cross sectional view of the hub along the lines 7—7 of FIG. 6.
Figure 8:
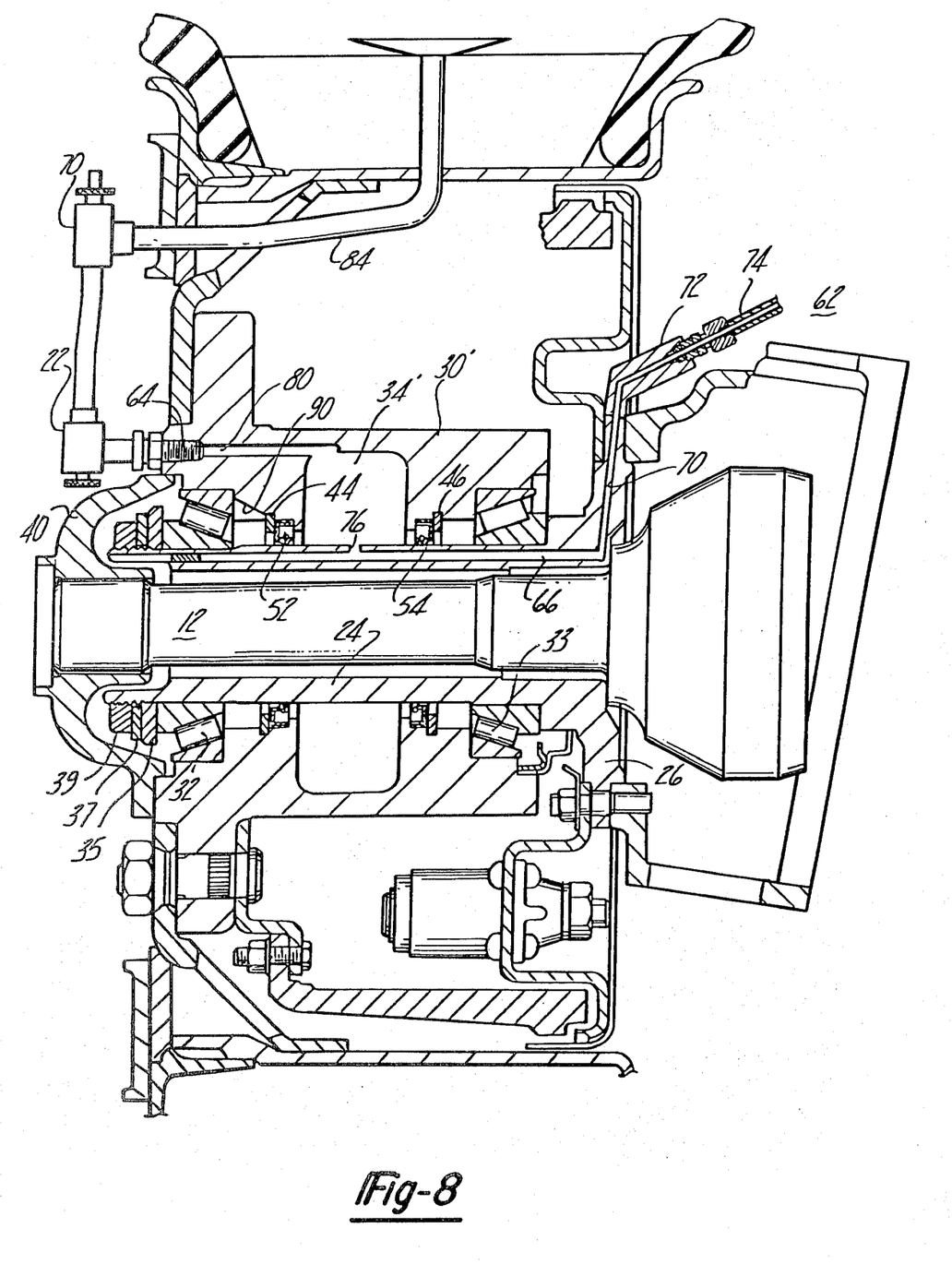
FIG. 8 is a cross sectional view of a wheel assembly made in accordance with an alternative embodiment of this invention.

Turning then to FIGS. 6–8, hub 30' is a one-piece metal construction preferably cast from grade I or II malleable iron. The central aperture through hub 30' is defined by an annular inner surface generally designated by the numeral 83. A pair of shoulders 85, 87 are formed in surface 83, one on each side of cavity 34'. A pair of grooves 88, 89 are also formed in surface 83 spaced a predetermined distance from shoulders 85 and 87, respectively. In this embodiment hub 30' includes a plurality of equally spaced ramp surfaces 90, 91 and 92 located inboard of the annular surface for receiving the bearings. Such a construction allows the bearing assembly to be easily extracted from the hub, for example, to replace them. The bearing assemblies can be removed by a device having three reversely curled fingers. The bearings are extracted by extending the fingers through the central opening in the bearing assembly, expanding them into ramp surfaces 90, 91 and 92, and then retracting them taking with them the bearing assembly.

Figure 9:
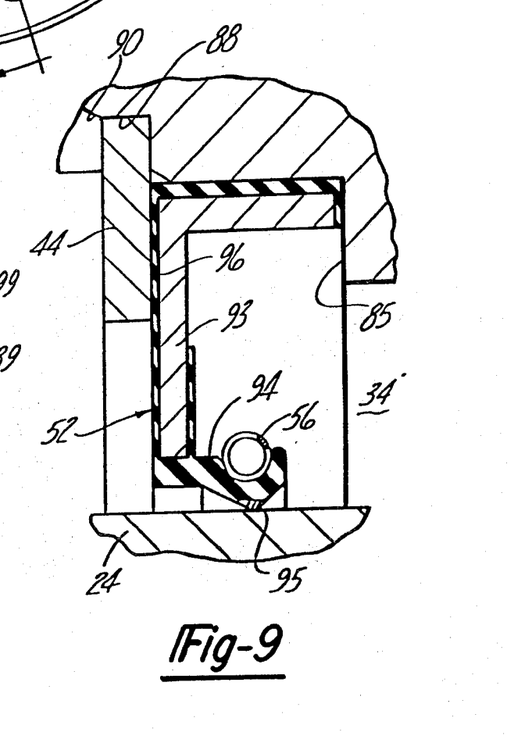
FIG. 9 is an enlarged fragmentary view of the rotating seal construction which may be used in both embodiments of the wheel assemblies.

Giving special attention now to FIGS. 8 and 9, snap rings 44 and 46 are located in grooves 88 and 89, respectively. Sealing ring 52 is held laterally in place between snap ring 44 and shoulder 85. Similarly, sealing ring 54 is held in place between snap ring 46 and shoulder 87 of hub 30'. FIG. 9 illustrates the details of the sealing rings which can be used in both of the embodiments. The body 93 of each sealing ring is made of a rigid material such as steel. Body 93 defines the vertical edge portion and the outer peripheral portion or leg of the device. The inner peripheral portion is defined by a generally horizontally extending flexible lip 94 which is made of a relatively high durometer polymeric rubber material. Preferably, the lip 94 is made of Nitrile polymer having a 40–45 durometer. In this particular embodiment lip 94 includes a tip 95 of wear resistant material. In this example tip 95 is made of TEFLON (polytetraflouroethylene) which is formed by including a ring of TEFLON in the molding process when lip 94 is made and then by machining the TEFLON ring thereafter as desired. The tip 95 provides a self-lubricating engagement surface which prolongs the sealing affect when there is little or no lubricant on spindle 24. The outer surface of body 93 is preferably coated with a thin layer of sealing material. In the preferred embodiment coating 93 is a rubber-like polymer and, more particularly, is made of Nitrile polymer having a 10–15 durometer. As an alternative to the use of a Nitrile lip with a TEFLON insert, the lip portion may be made with viton which tends to exhibit good high temperature and low abrasion characteristics.

It can now be appreciated that the sealing construction of both embodiments provides substantial advantages over the construction of the prior art. It is relatively simple and easy to assembly since there are very few individual parts. The present invention further provides an excellent rotating seal which blocks air from escaping between the nonrotating and rotating parts of the wheel assembly. When cavity 34 or 34' contains compressed air of lips 94 of the sealing rings 52 and 54 are forced downwardly on the nonrotating spindle 24 to provide an excellent seal. The sealing rings are rugged and are expected to exhibit superior wear characteristics. It is also believed that the relatively large volume provided by cavity 34(34') in the hub may play an important role in speeding up the inflation/deflation time of the automatic tire inflation system. The cavity effectively forms a small holding tank capable of delivering a substantial amount of air to the tires. The cavity may also tend to serve as a buffer zone to minimize turbulence in the air stream before it is directed through the relatively small air passageways in the remaining portions of the system. These advantages are especially pronounced in the integral hub design of the latter embodiment.

Figure 4:
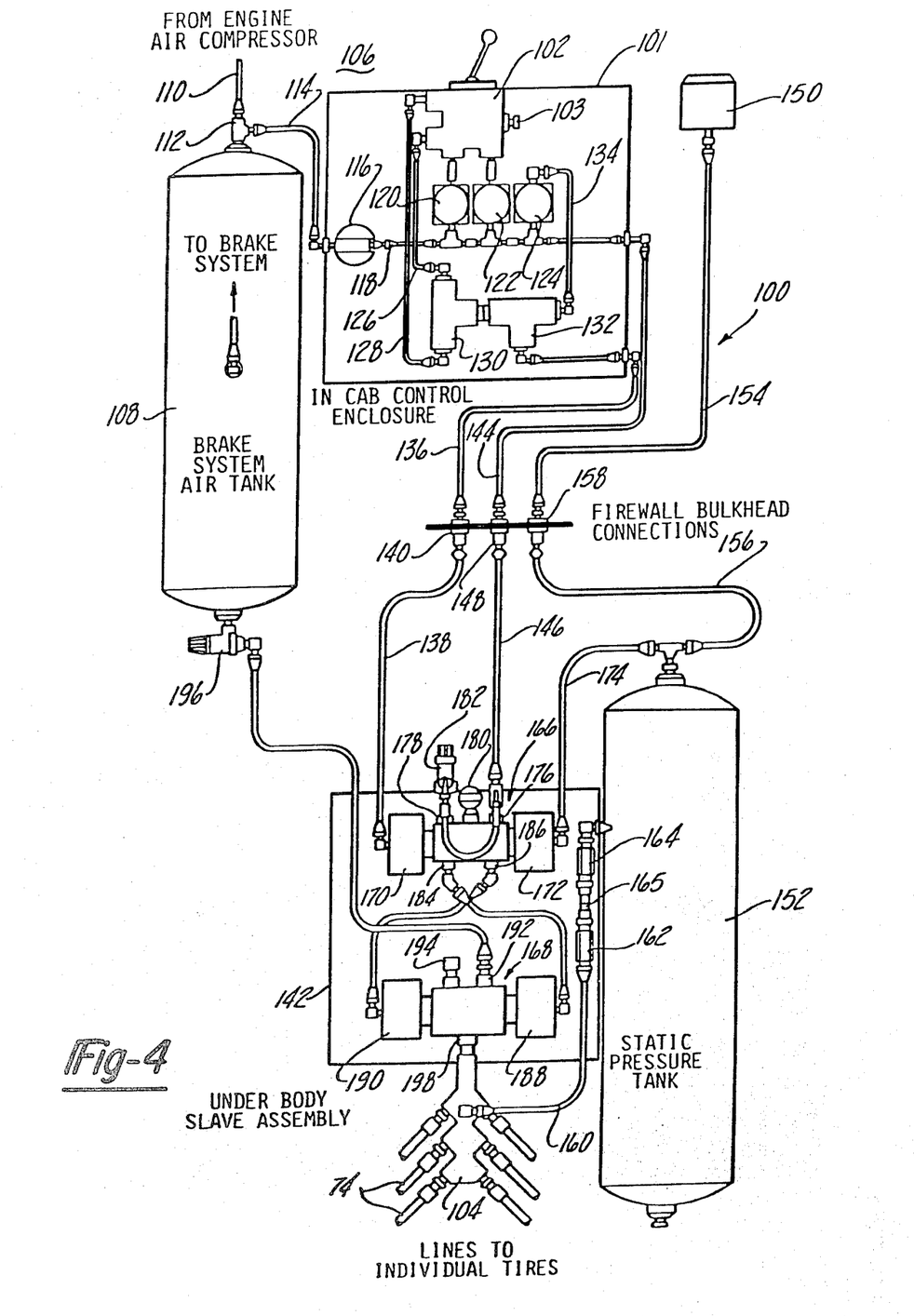
FIG. 4 is a view which pictorially illustrates the control system for regulating the air pressure in the tires pursuant to another aspect of this invnetion.
Figure 5:
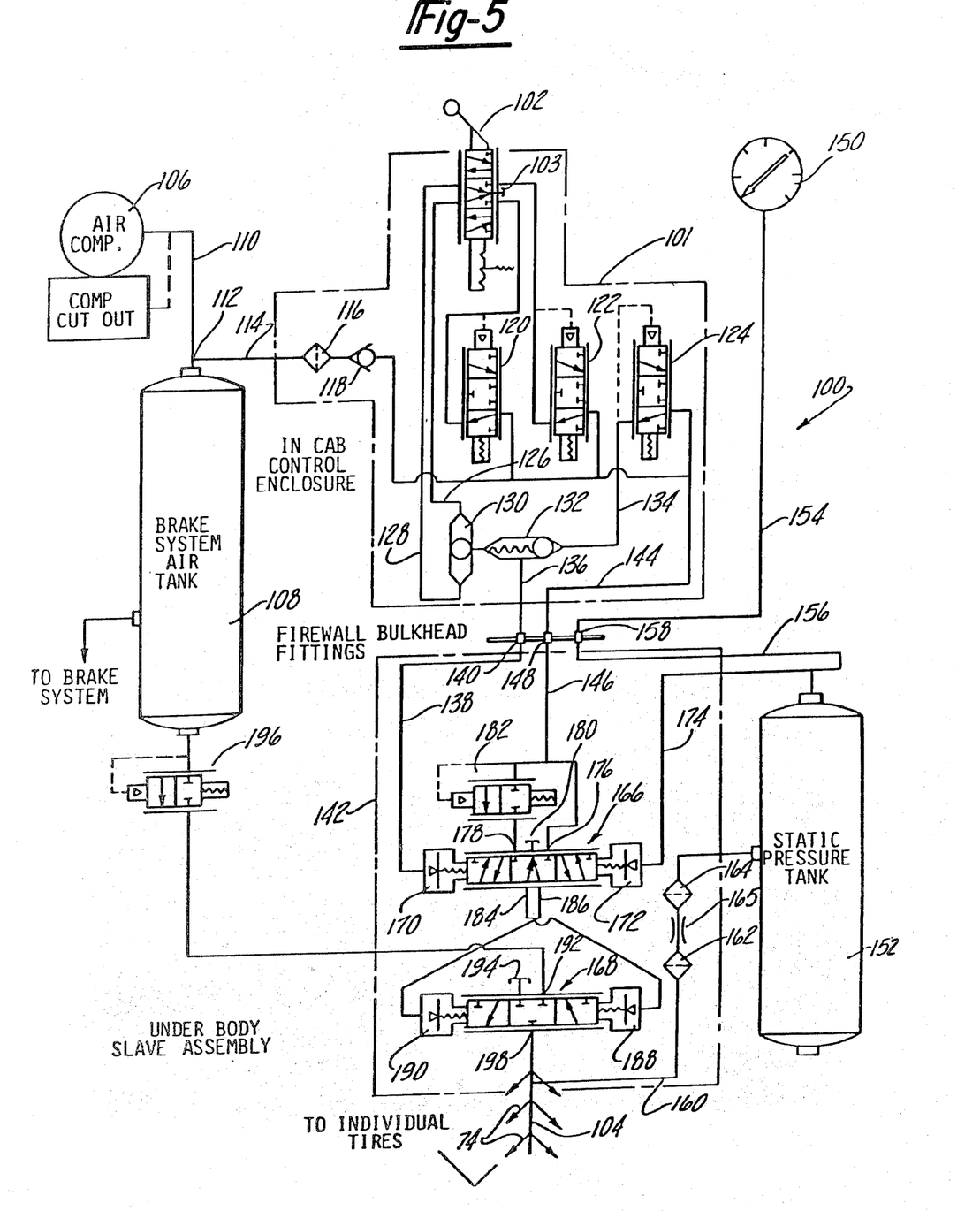
FIG. 5 is a view similar to FIG. 4 which schematically illustrates the pneumatic components of the control system.

Turning now to FIGS. 4 and 5, the automatic control system 100 for regulating the air pressure to the various wheel assemblies will be described. FIG. 4 illustrates the control system in a pictorial manner whereas FIG. 5 schematically represents the various components therein using well known pneumatic symbols. Common elements in these two figures will be referenced by the same numeral where possible.

Like the wheel assembly feature of this invention, the control system is readily adapted for use in conventional military vehicles. In general, the control system employs a control box 101 which is mounted within the cab of vehicle 10. Depending upon the setting of a multi-positioned toggle valve 102, the system operates to inflate or deflate the tires by supplying or exhausting air through manifold 104 which is connected to the respective tires by way of hoses 74. In addition, the control system automatically maintains the tires at the preselected pressure thereby adjusting for increases or decreases in tire pressure due to punctures, increased operating temperatures, etc.

The sole source of air for the control system is from an air compressor 106 which is typically used to supply compressed air to an air tank 108 used in the vehicular air braking system. Air compressor 106 typically generates air pressures in line 110 of about 120 psi.

A minute amount of air from compressor 106 is used as pilot air to control the switching of the inflate/deflate valves. The air can be conveniently bled off from a fitting 112 on an air manifold under the dash which supplies air to the vehicle's accessories such as an air horn or windshield wipers. The term "pilot air" means that it is supplied from a source that is independent of the desired and actual pressure within the tires. The air from compressor 106 is fed through inlet line 114 to the control box in the vehicle cabin.

Inlet line 114 is connected to an air filter 116 which filters dirt and separates water from the air. The output of air filter 116 is connected to a check valve 118 to maintain a constant control pressure in the downstream side of the control system despite fluctuating air pressures delivered by air compressor 106 which can be caused by use of the air brakes or tire inflation. A set of three fixed pressure regulator devices are used to generate preset reguated pressures at their outlets. Pressure regulator device 120 is designed to provide 75 psi pressure at its outlet. Pressure regulator device 122 is designed for 30 psi while pressure regulator 124 generates 10 psi at its output.

The outputs of regulator devices 120 and 122 are connected to input ports of selector device 102. Selector device 102 is a three position toggle valve which operates in one position to connect the output of pressure regulator device 120 to the outlet line 126, while line 128 is exhausted. In a second position the outlet from the 30 psi pressure regulator 122 is connected to outlet line 128, while line 126 is exhausted. In a third position neither of the outputs from regulator devices 120 or 122 are connected to lines 126 or 128, but, instead, lines 126 and 128 are both exhausted through exhaust port 103.

Lines 126 and 128 are coupled to opposite sides of a shuttle valve 130, the output of which is connected to one side of shuttle valve 132. The opposite side of shuttle valve 132 is connected to the output of the 10 psi pressure regulator device 124 over line 134. Shuttle valves 130 and 132 operate under well known principles in which the higher of the two pressures at their inlets are coupled to their respective outlets. For purposes that will be explained later, shuttle valve 132 is biased at about 3 psi such that the air passage from regulator 124 will be closed until the pressure of the other side of valve 132 is 7 psi or less.

Thus, it can be appreciated that the pressure supplied at the outlet of shuttle valve 132 will either be 75, 30 or 10 psi depending upon the position of selector device 102. This selected pressure will be referred to as the control pressure and it is coupled over lines 136 and 138 through firewall bulkhead connection 140 to an inflate/deflate assembly 142. Pilot air is similarly delivered to assembly 142 over lines 144, 146 through bulkhead connection 148. If desired, a tire pressure gauge 150 can also be provided in the vehicle cab. Gauge 150 is connected to a static pressure tank 152 by way of lines 154, 156 through bulkhead connection 158. Static pressure tank 152 is at the current static pressure of the tires. Tank 152 is connected to the tires through manifold 104 by way of inlet line 160 which passes through in line air filters 162, 164 on either side of a fixed orifice 165 which restricts the flow to and from static pressure tank 152 so that the pressure in tank 152 is always the same as that in the tires.

The inflate/deflate assembly 142 employs two rolling diaphragm shuttle valves 166 and 168 which work in a master-slave relationship. Master valve 166 determines whether the tires should be inflated, deflated or remain unchanged as a function of the pressure differential between the desired control pressure and the static pressure within the tires. Slave valve 168 operates to delfate or inflate the tires in response to the control decision made by valve 166.

The inputs and outputs of valves 166 and 168 as well as their respective operations can be more easily understood by reference to the schematic of FIG. 5. In FIG. 5 the positions of the pneumatic components therein are all shown with no air pressure in the system, i.e. in a neutral position. With specific references to valve 166, its control inputs 170 and 172 are connected to the selected control pressure over line 138 and the static pressure of the tires over line 174 from static pressure tank 152, respectively. Valve 166 includes two input ports 176, 178 and an exhaust port 180. The pilot air over line 146 is connected directly to input port 176 but passes through a priority valve 182 before entering input port 178. Priority valve 182 is designed to close at pressures less than about 75 psi for the purposes that will later be explained.

Control valve 166 also includes two output ports 184 and 186 which in turn are connected to control inputs 188, 190, respectively, of valve 168. The arrows in the valves shown in FIG. 5 show the interconnections between the input ports and output ports that are made in the three stages of the valve operation. In the neutral stage where pressures on control inputs 170 and 172 are the same, the output ports 184 and 186 are connected back through to the exhaust port 180. When the pressure on control input 170 is greater than that on control input 172, pilot air from input port 176 is connected to output port 186 and output port 184 is connected to exhaust port 180. In contrast, if the static pressure on control input 172 is greater, then the pilot air passing by way of priority valve 182 through input port 178 is connected to output port 184, with output port 186 being exhausted through exhaust port 180.

Valve 168 operates under the same principles. It includes one input port 192 and an exhaust port 194. Input port 192 is connected to the output of the brake system air tank 108 through a priority valve 196. Priority valve 196 operates to close when the pressure within tank 108 falls to below about 75 psi for the reasons that will be explained later herein. The output port 198 of valve 168 is connected to manifold 104 which, as stated before, is connected to the tires through the wheel assemblies 14. When the pressure at control input 190 is greater than that of 188, valve 168 operates to couple the pressurized air from tank 108 through input port 192 to output port 198 to thereby inflate the tires. In contrast, when control input 188 is supplied with higher pressure, the output port 198 is connected to the exhaust port 194 so that the tires are deflated. When the pressures on control inputs 190 and 188 are the same, no inflation or deflation of the tires occurs.

INDUSTRIAL APPLICABILITY

When the engine of vehicle 10 begins running the compressor 106 fills air tank 108 to a pressure of about 90 psi whereupon priority valve 196 opens making air available for tire inflation. Normally, the pressure in tank 108 can increase to a maximum of 120 psi. If the pressure in the brake tank 108 falls below about 75 psi, priority valve 196 closes thereby permitting pressure in the brake tank to build up to a safe operating pressure for the brake system which takes priority over the tire inflation system. Priority valve 196 also insures priority air to the brake system in the event of a major tire system failure.

To inflate or deflate the tires the user places toggle valve 102 into one of the three preset positions. Preferably, the valve 102 is labeled according to terrain or road conditions: one setting (70 psi) for highway conditions, a second setting (30 psi) for cross country, and a third position (10 psi) for mud, sand or snow operation.

Assume that the tires are inflated to 10 psi and the operator switches toggle valve 102 to the position associated with 75 psi. The control system will automatically inflate the tires and maintain them at this pressure without further manual intervention.

The output of the 75 psi pressure regulator 120 is connected by the selected setting of toggle valve 102 to output line 126. Shuttle valve 130 allows only the higher pressure of lines 128 and 126 to pass through, which in this case is 75 psi. Priority shuttle valve 132 similarly allows only the higher of the 10 psi pressure on line 134 or the output of valve 130 to pass through. Consequently, the 75 psi pressure becomes the new control pressure which is coupled via line 138 to the control input 170 of valve 166. Since the right hand control input 172 is at 10 psi (the current static pressure of the tires) valve 166 shuttles to connect pilot air from line 146 through input port 176 and output port 186 to the control input 190 of valve 168. The right hand control input 188 of valve 168 is connected to the exhaust port 180 of valve 166. Since the left hand control input 190 is at a greater pressure than the right hand control input 188, valve 168 shuttles to connect the pressurized air from air tank 108 through port 192 to outlet 198 which, in turn, is coupled to manifold 104. The air is thus allowed to flow into the tires and into static pressure tank 152. The flow through restriction of the fixed orifice 165 is such that the pressure in static tank 152 is the same as any and all tires at all times. When the tires are inflated to 75 psi the pressure in tank 152 is likewise at 75 psi. Thus, the right hand control input 172 of valve 166 now is at the same pressure as the left hand control input 170. This places the system in balance such that valve 166 shuttles to the neutral position (as shown in FIG. 5) and blocks further pilot air from being supplied to the control inputs of valve 168. Thus, valve 168 also shuttles to the neutral position closing off further communication between tank 108 and manifold 104.

Assume that the vehicle now is on soft terrain and the user switches selector device 102 to the third (10 psi) position. With selector device 102 in this position (as shown in FIG. 5) lines 128 and 126 are coupled to the exhaust port 103 of shuttle valve 102. This permits the 75 psi pressure in the lines leading to control input 170 of valvve 166 to be released back through the exhaust port 103. The released downstream pressure in shuttle valve 132 must fall below about 7 psi before valve 132 shuttles to allow the accurately controlled 10 psi air from pressure regulator 124 to instead pass through to control valve 166. This produces an accurate 10 psi control pressure that may not otherwise be possible with a standard (unbiased) shuttle valve in this position due to hystersis effects.

With 10 psi now applied to control input 170 of valve 166 and 75 psi still applied to the right hand control input 172, the system no longer is in balance. Control valve 166 is then shuttled to the left connecting pilot air from input port 178 to outlet port 184 which is connected to the right hand control input 188 of valve 168. This causes valve 168 to similarly shuttle to the left to connect manifold 104 to the exhaust port 194. In such manner air is allowed to flow from the tires and static pressure tank 152 into the atmosphere until the pressures on both sides of control valve 166 are the same, i.e. 10 psi. At that time valve 166 shuttles to its neutral position cutting off pilot air to valve 168 which, in turn, also shuttles to its neutral position cutting off all air flow. The control pressure, the pressure in the tires, static tank pressure and tire pressure gauge are now all equal to 10 psi.

Provision is also made for preventing unwanted tire deflation in the event that there is a loss of air pressure which controls the valving arrangement of the control system. This pressure loss can possibly occur when the vehicle is parked for a period of time causing the brake tanks to bleed down creating a pressure loss. Also, a break in the control lines would cause a loss of control pressure. Under these conditions, priority valve 182 prevents unwanted tire deflation. Priority valve 182 is connected between the pilot air line 146 and the inlet port 178 of valve 166 which is used in the deflate mode to provide pressure to the right hand control input of valve 168. Priority valve 182 is designed to close at 75 psi. Accordingly, if the control pressure should drop below 75 psi, no pilot air would pass through valve 166 to valve 168 thereby preventing valve 168 from shuttling to the deflate stage.

It should also be realized that the control system of the present invention automatically maintains the preselected desired air pressure within the tires even though conditions in the tires may change. For example, if there is a slow leak or puncture in the tires, static pressure tank 152 will fall below the preselected pressure thereby causing valve 166 and 168 to enter into the inflate mode as necessary to maintain the desired pressure. Similarly, if the temperature in the tires increases so as to increase the pressure therein beyond the preselected temperature, the valving arrangement of the control system of the present invention will automatically deflate the tires until the desired pressure is reached. All this is accomplished without any further manual intervention from the operator.

Those persons experienced in the art can now appreciate that the present invention offers several significant advantages over known central tire inflation systems. The present system is truly automatic and requires no operator intervention aside from moving the toggle switch to the position associated with the terrain on which the vehicle is riding. Once the selection has been made the system automatically adjusts and maintains the tires at that selected pressure. The system also operates very quickly. It is capable of deflating all of the tires (six 14.00×20 tires) to 10 psi from 75 psi in three minutes and forty seconds, much more quickly than known inflation systems. This is because the slave valve 168 is quickly shuttled to its full operational positions once the inflate/deflate decision has been made by master valve 166. Both the wheel assembly and air regulating control system are extremely cost effective utilizing a minimum number of components. Additionally, the tire inflation system of the present invention can be readily adapted to conventional military vehicles with a minimum amount of modification. All of these advantages result while at the same time providing excellent reliability even under adverse conditions. The rotating air coupling of the present invention is isolated from adverse road conditions since it is interiorly located and it is provided without cutting into load bearing structures or disturbing the wheel bearings.

Pursuant to another aspect of this invention various components of the just described automatic tire inflation system may be incorporated as part of a kit for retrofitting vehicles to include such a system. The number of components in the kit will depend upon the type of vehicle to be retrofitted and the extent of inventory of the various parts that the user wishes to maintain. For example, the kit may include all new replacement parts for either one of the wheel assemblies of the two embodiments together with all of the new parts necessary to employ the valve control system 100. It should be noted that the air compressor tank 108 normally will not be required since it is standard equipment on most vehicles employing air brakes. The vehicles may also already employ wheel assemblies which are capable of accepting an automatic tire inflation system but for reasons of economy the vehicle does not include the valve control system. This would permit a manufacturer to mass produce a certain vehicle and then selectively choose which one of those vehicles should include an automatic tire inflation system. Consequently, those vehicles which will be used on certain terrain may be so modified while other vehicles used in less demanding applications are not. In those instances the inlets and outlets of predrilled wheel assemblies will generally be plugged. The retrofitting kit would then include the parts making up the valve control system only. The plugs can be removed in the wheel assemblies and the valve control system readily added to thereby equip the vehicles with an automatic tire inflation system.

Figure 10:
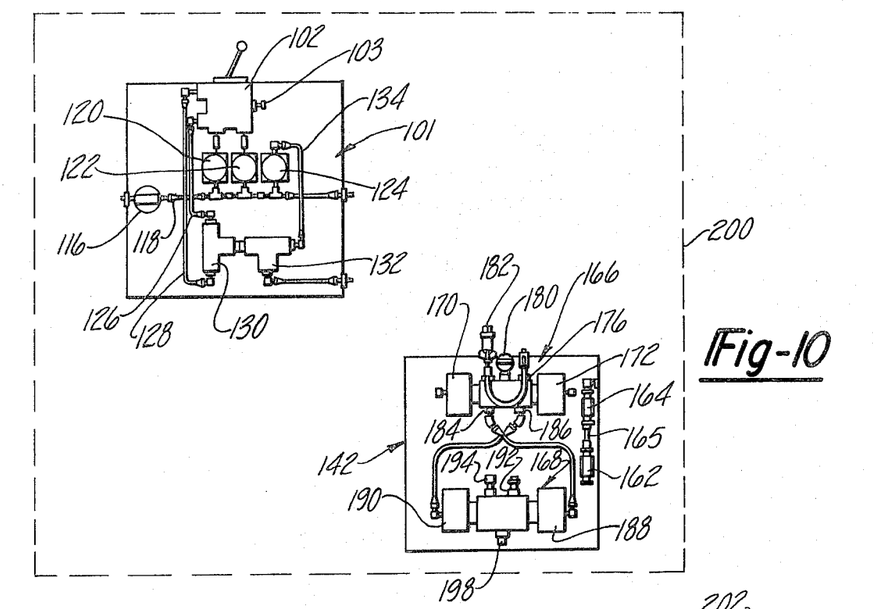
FIG. 10 is a plan view schematically illustrating the basic parts of the kit of the preferred embodiment of the present invention.
Figure 11:
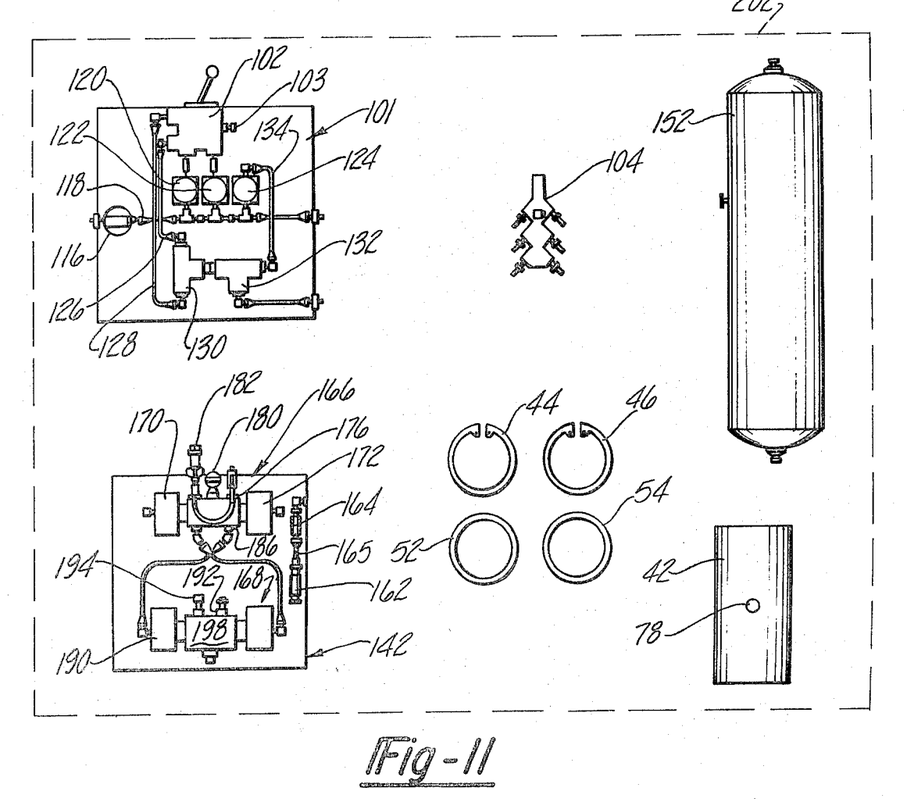
FIG. 11 is a plan view schematically illustrating an alternative embodiment of the kit showing more parts to be included therein.

Those skilled in the art will appreciate that the design of the present invention lends itself to easy incorporation into existing vehicles. The control box 101 can be readily mounted in the cab and the various pressure lines routed from the cab through the normal fire wall of the vehicle as shown in the drawings. The valve assembly 142 and manifold 104 is then mounted at a convenient location on the frame of the vehicle, as is the static pressure tank 152. The various air lines can be easily interconnected at appropriate locations to finish the retrofitting operation. As noted above, the contents of the kit may vary somewhat since the user may have flexible air hoses, couplings, tanks, etc. in stock. In those instances the kit would just contain the control box 101 and the valve assembly 142 as shown in FIG. 10. The parts may be packaged together in a suitable container as represented by the dotted line 200 in FIG. 10 or the parts may be packaged and shipped separately. As illustrated in FIG. 11, the kit may contain more parts depending upon the needs of the user. For example, the kit may also include the snap rings 44, 46 and sealing rings 52, 54 for use in the wheel assembly. If the wheel is of the conventional type as shown in FIG. 2, the kit may further include the sleeve 42 for adapting the conventional wheel assembly to provide it with the rotating seal portion of the air passageway for the tire inflation air. The kit shown therein also includes the static pressure tank 152 and manifold 104. Again, these components may be packaged together in a container represented by the dotted lines 202 or may be packaged separately for shipment.

Other modifications of the present invention will become apparent to one skilled in the art after a study of the drawings, specification and following claims.

We claim:

1. A kit for retrofitting vehicles to include an automatic tire inflation systems, said kit comprising:
   a control box adapted to be mounted in the cab of the vehicle, said control box including manually actuable selector means for selecting one of a plurality of preset air pressure settings for the tires; and
   an inflate/deflate valving assembly adapted to be mounted on the vehicle, said assembly including first and second interconnected shuttle valves operating in a master/slave relationship, said first valve being operative to selectively supply pilot air to control the position of the second valve depending upon the pressure differential between actual and desired tire pressures applied to said first valve, said second valve being responsive exclusively to the pilot air to either completely shuttle to one position for inflating the tires or to another position for deflating the tires.

2. The kit of claim 1 which further comprises:
   a static pressure tank adapted to be connected to the tires for providing a representation of the actual pressure within the tires.

3. The kit of claim 1 which further includes means for modifying a conventional wheel assembly to provide a sealted air passageway between an inlet in nonrotating portions thereof and an outlet in rotating portions thereof.

4. A kit for retrofitting vehicles to include an automatic tire inflation system, said kit comprising:
   a control box adapted to be mounted in the cab of the vehicle, said control box including manually actuable selector means for selecting desired pressure for the tires;
   inflate/deflate valve means adapted to be mounted on the vehicle, said valve means including at least one valve having first and second control inputs, an outlet port adapted to be connected to the tires, a first inlet port adapted to be connected to a source of compressed air, and an exhaust port;
   said inflate/deflate valve means being operative to selectively connect the outlet port to the first or second input port to the first inlet port or exhaust port as a function of the pressure differential between the desired and actual tire pressures whereby to automatically inflate or deflate the tires to maintain them at the desired pressure as selected by the user.

5. The kit of claim 4 which further includes:
   a static pressure tank having an inlet adapted to be connected to the tires and an outlet providing an indication of the actual pressure in the tires.

6. The kit of claim 5 which further includes:
   a device having a fixed orifice adapted to be coupled between the inlet of the tank and the tires.

7. The kit of claim 6 which further includes:
   manifold means having an inlet adapted to be coupled to said device, and a plurality of outlets adapted to be connected to the tires.

8. The kit of claim 4 wherein said inflate/deflate valve means includes first and second interconnected shuttle valves operating in a master/slave relationship, said first valve being operative to selectively supply pilot air to control the position of the second valve depending upon the pressure differential between actual and desired pressures applied to said first valve, said second valve being responsive exlcusively to the pilot air to either completely shuttle to one position for inflating the tires or to another position for deflating the tires.

9. The kit of claim 5 wherein said control box includes:
   a plurality of pressure regulating devices, each device providing a preset pressure at its output and being selectable by the selector device, with the output of the selected pressure regulating device being adapted to be connected to said first valve, and the outlet of the static pressure tank also being adapted to be connected to the first valve.

10. The kit of claim 4 which further includes:
    parts for defining an air passageway for tire inflation air to pass through a wheel assembly on the vehicle.

11. The kit of claim 10 wherein said parts includes:
    a pair of sealing rings, outer peripheral surfaces thereof being adapted to be secured to a rotating part of the wheel assembly, and inner peripheral surfaces of the sealing rings being adapted to ride on a nonrotating part of the wheel assembly.

12. The kit of claim 11 which further includes:
    snap rings for securing the sealing rings to the nonrotating part of the wheel assembly.

13. The kit of claim 11 which further includes a sleeve having an opening in a wall thereof, and receiving means formed in an inner peripheral surface thereof for receiving said sealing rings.

14. A kit for retrofitting vehicles to include an automatic tire inflation system, said kit comprising:
    a control box including manually actuable selector means for selecting a desired pressure for tires of the vehicle;
    inflate/deflate means for inflating or deflating the tires as a function of the pressure differential between the actual tire pressure and desired tire pressure, said inflate/deflate means including a valve having first and second control inputs, an outlet port, an inlet port adapted to be connected to a source of compressed air, and an exhaust port;
    a manifold having an inlet adapted to be connected to the outlet port of the valve, and said manifold having a plurality of outlets adapted to be connected to the tires;
    a static pressure tank having an inlet and an outlet;
    a device having a fixed orifice adapted to be connected between said manifold and the inlet of said static pressure tank, with the outlet of said static pressure tank providing a representation of the actual pressure within the tires; and
    means for defining a rotating seal in wheel assemblies of the vehicle;
    whereby said valve operates to selectively connect the inlet port or exhaust port to the outlet port thereof for inflating or deflating the tires as a function of the pressure differential between the outlet of the static pressure tank and the desired pressure selected by the user via the control box.

* * * * *